United States Patent [19]
Meyer et al.

[11] 3,901,825
[45] Aug. 26, 1975

[54] CHROME CATALYST

[75] Inventors: Jeffrey G. Meyer; Glennis L. Phipps, both of Adrian, Mich.

[73] Assignee: Anderson Development Company, Adrian, Mich.

[22] Filed: Mar. 29, 1974

[21] Appl. No.: 456,123

[52] U.S. Cl. ....... 252/431 P; 260/88.2 R; 260/93.7; 260/94.9 C
[51] Int. Cl. ............................................. B01j 11/82
[58] Field of Search ................................ 252/431 P

[56] References Cited
UNITED STATES PATENTS

| | | | |
|---|---|---|---|
| 3,349,064 | 10/1967 | Gumboldt et al. | 252/429 B X |
| 3,437,649 | 4/1969 | Mueller | 252/431 P X |
| 3,474,080 | 10/1969 | Rekers | 252/431 P X |
| 3,634,340 | 1/1972 | Gunther et al. | 252/431 P X |
| 3,668,146 | 6/1972 | Ruhle | 252/431 P X |

Primary Examiner—Patrick P. Garvin

[57] ABSTRACT

This invention comprises the novel composition formed by mixing (A) a chromium tris-diorgano-orthophosphate of the general formula $Cr[OP(O)(OR)_2]_3$ wherein R can be an alkyl, alkoxyalkyl or cycloalkyl group of one to about eight carbon atoms and the chlorinated and brominated derivatives thereof, (B) an alkyl aluminum compound of the general formula $R'_2R''Al$ in which each $R'$ and $R''$ can be an alkyl group of 1 to 6 carbon atoms and each $R''$ can also be a hydrogen atom, and (C) a halogenated olefin of four to about eight carbon atoms containing at least four halogen atoms at least two of which are attached to doubly bonded carbon atoms.

This invention also comprises the use of this novel combination as a catalyst for the polymerization of ethylene alone or with propylene and other olefins. This invention also comprises the polymer products prepared by said method.

4 Claims, No Drawings

CHROME CATALYST

BACKGROUND OF THE INVENTION

1. Field of the Invention

The field of this invention comprises catalysts for the polymerization of olefins, particularly ethylene. The preferred commercial catalysts used heretofore have been combinations of alkyl- and aryl-substituted aluminum compounds with a variety of metal compounds.

2. Description of the Prior Art

The prior art which appears most pertinent to the subject invention includes U.S. Pat. Nos. 3,113,115; 3,114,743; 3,257,332; and 3,574,138, which disclose two-component polymerization catalyst systems and U.S. Pat. No. 3,349,064 which discloses a three-component system. Of particular interest is U.S. Pat. No. 3,257,332, which discloses a two-component catalyst system comprising (A) an aluminum trialkyl and (B) a compound of a metal on the left-hand side of the IV to VI Groups of the Periodic System with the preferred compounds including salts of chromium where "salts" are not specifically defined but apparently include halides, acetylacetonates and butylates. Also of particular interest is U.S. Pat. No. 3,349,064, which discloses a three-component catalyst system comprising (A) an aluminum trialkyl, (B) a solvent-soluble vanadium compound and (C) a promoter defined as "unsaturated carbocyclic compounds containing at least 4 halogen atoms, at least 2 of which are attached to doubly bonded carbon atoms and at least one of which is attached to a single bound carbon atom alpha to the double bond." The disclosures of these references are hereby incorporated by reference.

SUMMARY OF THE INVENTION

This invention comprises the composition formed by mixing (A) a chromium tris-diorgano-orthophosphate of the formula $Cr[OP(O)(OR)_2]_3$ in which each R is selected from the class consisting of non-aromatic hydrocarbon groups free of aliphatic unsaturation and containing one to eight carbom atoms, non-aromatic hydrocarbon ether groups free of aliphatic unsaturation and containing three to six carbon atoms and chlorinated and brominated derivatives thereof, (B) an alkyl aluminum of the general formula $R'_2R''Al$ in which each R' and R'' can be any alkyl group of 1 to 6 carbon atoms and each R'' can also be a hydrogen atom, and (C) a halogenated olefin of from four to about eight carbon atoms, said olefin containing at least four halogen atoms at least two of which are attached to olefinic carbon atoms, there being at least one olefinic bond in conjugation with another double bond or at least one halogen atom attached to a carbon atom alpha to an olefinic double bond, the mole ratio of (A) to (B) to (C) being in the range of 0.001–0.1 : 1 : 1–10.

This invention also comprises the use of the abovedescribed catalyst combination in a method for alkylene polymerization consisting essentially of (1) mixing the catalyst system of (A), (B) and (C) described above with (D) at least one aliphatic hydrocarbon olefin containing no more than about 12 carbon atoms at a temperature and pressure and for a time sufficient to initiate the reaction of component (D), and (2) separating the resulting product from the mixture. The total amount of (A), (B) and (C) is present in an amount of at least 0.0001, preferably from about 0.001 to 0.05, total mole per mole of (D). This system operates spontaneously as soon as the components are mixed. The system temperature can range from 0° to 100°C. but is generally no greater than about 80°C. and preferably in the range of 20°C. The system pressure can range from 1 to 500 psig. but is preferably in the range of 10 to 100 psig. The desired reaction can take from one minute to 24 hours to initiate, but the reaction generally initiates in from 5 minutes to 2 hours and can be run continuously or batchwise after initiation.

This invention further comprises the products resulting from the above-described method, said products having physical properties that are superior to those in the prior art, particularly high molecular weight hard wax-like polyethylenes which have flexural moduli of about $3.0 \times 10^5$ psi and tensile strengths in the range of 4,000 to 20,000 psi as compared to the respective typical values of $1.0 \times 10^5$ psi and 2500 psi for commercial polyethylene and $2.0 \times 10^5$ and 5000 psi for commercial polypropylene.

DESCRIPTION OF THE PREFERRED EMBODIMENT

In the catalytic composition of this invention component (A) is a chromium tris-diorgano-orthophosphate of the formula $Cr[OP(O)(OR)_2]_3$ in which each R can be any alkyl, alkoxyalkyl or cycloalkyl group of up to eight carbon atoms or chlorinated and brominated derivatives thereof. Reference is made to copending patent application Ser. No. 319,621, filed Dec. 29, 1972 by Jeffrey G. Meyer wherein component (A) and its preparation is fully disclosed and claimed. The disclosure of said application is hereby incorporated herein by reference. As described in said application, the chromium tris-diorganoorthophosphate is preferably prepared by (1) reacting at 30° to 100°C. a metal salt $M'[OP(O)(OR)_2]_n$ in which R is as described above and M' is an alkali metal or alkaline earth metal with a chromium compound $M_aZ_b$ in which M is trivalent chromium and Z is a non-reducing substituent such as the hydroxyl group, an anion of a non-metallic inorganic acid or an organic carboxylic group of one to eighteen carbon atoms and (2) separating the desired product by standard means. A typical preparation is the refluxing together in benzene and water of equimolar amounts of chrome alum and magnesium bis(diethyl orthophosphate) for an hour followed by filtration and evaporation of the benzene phase.

Typical examples of component (A) include chromium tris(dipropyl orthophosphate), chromium tris(di-n-octyl orthophosphate), chromium tris(di-4,4-dimethylhexyl orthophosphate), chromium tris(di-2-ethylhexyl orthophosphate), chromium tris(diethyl orthophosphate), chromium tris(diisobutyl orthophosphate), chromium tris(monobutyl mono-tert-butyl orthophosphate), chromium tris(monopentyl mono-2-methylpentyl orthophosphate), chromium tris(di-3-methylhexyl orthophosphate), chromium tris(mono-2-ethylhexyl mono-3-methylhexyl orthophosphate), chromium tris(di-2,3-dimethylhexyl orthophosphate), chromium tris(dicyclohexyl orthophosphate), chromium tris(dibutyl orthophosphate), chromium bis(diethyl orthophosphate) mono(diisohexyl orthophosphate), chromium tris(di-3,3-dimethylpentyl orthophosphate), chromium bis(monoheptyl monohexyl orthophosphate) mono(monoheptyl monooctyl orthophosphate), chromium tris(di-2,2,4-trimethylpentyl orthophosphate), chromium tris(di-2-ethoxyethyl orthophosphate), chromium tris(dicyclopentyl orthophosphate), chromium tris(di-2,2-dimethylbutyl orthophosphate), chromium bis(monopropyl monobutyl orthophosphate) mono(monoamyl monohexyl orthophosphate), chromium tris(dicyclohexyl orthophosphate), chromium tris(dicyclobutyl orthophosphate), chromium tris(di-3-chloropropyl orthophosphate), chromium tris(bis-2,3-dibromopropyl orthophosphate) and chromium tris(di-2-chloroethyl orthophosphate).

Component (B) is an alkyl aluminum of the general formula R'$_2$R''Al. Each R' and R'' can be any alkyl group of 1 to 6 carbon atoms, and each R'' can also be hydrogen. Each R' and R'' can be, for example, a methyl, ethyl, propyl, isopropyl, n-butyl, sec-butyl, tert-butyl, pentyl or hexyl group. Preferably, the total number of carbon atoms in the R' and R'' substituents in any component (B) is in the range of 3 to 8. Examples of such preferred components (B) include trimethyl aluminum, triethyl aluminum and di-n-butyl aluminum hydride.

Component (C) is a halogenated olefin of from four to about eight carbon atoms. Among the preferred halogenated olefins which can be used are the carbocyclic compounds which are included in the compounds disclosed in U.S. Pat. No. 3,349,064. The general definition of these compounds is set forth above. The compounds are exemplified by hexachlorocyclopentadiene, 2,2,3,4,5,5-hexachlorocyclopentene-3; 2,3,4,5-tetrachloro-2,5-dibromocyclopentene-3; 1,2,3,4,7,7-hexachlorobicyclo-(2.2.1)heptadiene-2,5; hexachlorocyclopentene-3-one, hexachlorocyclopentene-4-one and related compounds in which bromine is substituted for chlorine or vice versa. In addition, linear halogenated conjugated diolefins are also preferred for use as component (C) so long as at least two halogen atoms are attached to doubly bonded, i.e., olefinic, carbon atoms as exemplified by hexachloro-1,3-butadiene; 1,2,3,4-tetrachloro-1,3-butadiene and 1,3,4,6-tetrachloro-2,4hexadiene. It is generally preferable to use perhalogenated conjugated dienes. Particularly preferred is hexachloro-1,3-butadiene, which is notable as being outside the scope of the compounds described in U.S. Pat. No. 3,349,064.

The catalyst composition of (A), (B) and (C) is prepared by simply mixing the components. The components can be mixed prior to addition to the polymerization reaction system or can be added simultaneously or separately to such reaction system. A mutual solvent can be used, if necessary, as is common in the art. It is preferable to add component (A) gradually to a polymerization system after all other ingredients are present in at least some amount.

The combination catalyst system is preferably used in the method comprising (1) mixing components (A), (B), and (C) as described above with (D) one or more aliphatic hydrocarbon monoolefins having preferably no more than about 12 carbon atoms, more preferably no more than 4 carbon atoms, at a temperature and pressure and for a time sufficient to cause the reaction of (D) and (2) separating the resulting product. The preferred olefin is ethylene alone or with some other monomer such as propylene.

The mole ratio of the total of (A), (B) and (C) to total (D) can be as little as 0.0001:1 but preferably ranges from 0.001:1 to 0.05:1.

The temperatures required for the polymerization reactions with the catalyst combinations of this invention are not particularly critical. Some heat may be necessary to initiate reaction such as heating to at least 30°C. The maximum temperature which can be employed is dependent on the melting points, boiling points and decomposition points of the catalytic components (A), (B) and (C), the monomers of component (D) and the products as well as the desired control over rate of reaction. For practical purposes, the minimum temperature is about 0°C. and the maximum temperature is about 100°C., the preferred temperature range being 20° to 40°C.

Ambient pressures are satisfactory, generally ranging from atmospheric pressure to no more than about 50 atmospheres, preferably no more than 100 psig.

Under these conditions of temperature and pressure the polymerization reactions can be operated batchwise for from five minutes to four hours or more or these reactions can be run continually, especially where the products are in a different physical state than the reactants making possible continuous addition of reactants and continuous separation of product.

For these polymerization reactions the reacting monomer or monomers may act as a solvent for the system. Alternatively, an inert solvent can be employed. Simple hydrocarbon oils containing no more than about eight carbon atoms and being such as benzene, toluene and n-heptane, and preferred as inert solvents.

The separation of the desired product is well within the skill of the art in that the desired product has a higher molecular weight than the reactants so that it can be precipitated out by cooling or other technique or can be selectively distilled.

Typically, for polymerization a reaction vessel is purged with some monomer (D) if gaseous or an inert gas such as nitrogen. Then an inert solvent such as heptane is added and the reactor is pressurized. The desired amounts of components (A), (B) and (C) are added, preferably in a mole ratio of about 0.01:1:2 respectively, with monomer to allow continuous reaction but not at such an excessive rate to kill the reaction. Solid product is allowed to settle and is filtered out.

The polymerization reaction appears to be enhanced by the presence of inert support material. Such material is generally retained in the polymer product and should therefore be used in amounts no greater than about 5 parts by weight per 100 parts by weight of (D). However, the support material is generally present in an amount by weight greater than the total weight of (A), (B) and (C). Suitable support materials are non-reinforcing powdered fillers having surface areas no greater than about 100 square meters per gram and include commercial silicas and talcs.

The polymer products obtained from the polymerization reactions have physical properties that are superior to those prepared by prior art methods and are therefore useful in substantially all applications for such polymers. Substantial improvement was found in the tensile strength, elastic modulus and adhesiveness of polyethylene.

The following examples are illustrative of the best presently-known methods of practicing this invention and are not intended to limit this invention the scope of which is delineated in the appended claims. Unless otherwise stated, all quantitative measurements are by weight.

EXAMPLE I

A stirred two-liter autoclave with cooling coils to control temperature and maintain 30°C. was purged with ethylene gas. Subsequently 1300 ml. of dry, pure n-heptane was added, and the reactor was pressured to 30 psig. with ethylene gas. Catalyst solution containing 0.0234 gram (0.065 milli-gm.-mole) of chromium (III) trisdiethyl orthophosphate in 7.5 ml. (48.4 milli-gm.-mole) of hexachloro-1,3-butadiene and cocatalyst containing 2.4 grams (21.0 milli-gm.-moles) of triethyl aluminum were injected into the reactor. Within 10 minutes white precipitate formed, and the reactor pressure decreased to 20 psig. as ethylene was consumed by the reaction. Ethylene was added intermittently during the reaction period to maintain 30 to 40 psig. in the reactor, while cooling maintained a temperature of 30°C. throughout the reaction period. One hour after the initial catalyst injection, the reactor contents were vented into a beaker. The slurry was filtered and the solids were dried to recover 149 grams of a friable white polymer powder.

A film was molded from this polymer at 140°C. The infrared spectrum included absorption bands at 850, 950, 980, 1,130, 2,170, 2,340 and 2,440 cm.$^{-1}$ in addition to absorption bands common with polyethylene homopolymer. Residual chloride in the polymer was 0.40 percent.

Tensile strength of the polymer film was measured to be 19,700 psi., and the elastic modulus was $3.3 \times 10^5$ psi.

A repetition of the above polymer preparation produced 156 grams of friable white polymer powder having a number average molecular weight of 26,500, a weight average molecular weight of 781,000, a density of 0.956 gm./ml., a melting point of 133°C. and a ratio of 3.6 methyl groups per 1000 carbon atoms showing essentially no branching.

A polyethylene product similarly prepared at 80°C. was characterized as a material similar to linear polyethylene and usable as a wax. This product was found to have a melting point of about 124°C., a density of 0.965 gm./ml., a number average molecular weight of 2800, a weight average molecular weight of 43,000 and a ratio of 7.6 methyl groups per 1000 carbon atoms.

EXAMPLE II

The experiment of Example I was repeated, using a mixture of 0.38 gram (1.05 milli-gm.-mole) of the chromium compound and 7.5 ml. (46.8 milli-gm.-mole) of hexachloro-1,3-cyclopentadiene as the catalyst solution. The solid product weighing 39 grams gave the characteristic infrared absorption bands of the polymer from Example I and similar physical characteristics.

EXAMPLE III

The experiment of Example II was repeated, omitting the chromium compound from the catalyst composition. No polymer was obtained from this experiment.

EXAMPLE IV

A stirred two-liter autoclave with controlled cooling coils was purged and then pressurized to 30 psig. with ethylene gas. Subsequently, 1,300 ml. of dry, pure n-heptane was added followed by 320 ml. of liquid propylene. A reservoir containing an equimolar mixture of ethylene and propylene was coupled to the autoclave, and this mixture was introduced at a rate sufficient to maintain a pressure of 60 psig. throughout the copolymerization reaction.

Catalyst was prepared containing 0.38 grams chromium (III) trisdiethyl orthophosphate and 7.5 ml. of hexachloro-1,3-butadiene. Cocatalyst contained 2.4 grams triethylaluminum. The catalyst and cocatalyst were metered concurrently over a period of 10 minutes into the reactor, after the completion of which heat of reaction raised the autoclave contents to 23°C. After a total of 45 minutes from initial catalyst addition, the reaction contents was vented to a beaker and the solvent was evaporated leaving 126 grams gummy residue. The infrared spectrum of this material revealed absorption corresponding to ethylenepropylene copolymer.

EXAMPLE V

This experiment was set up to compare the catalytic activities of the chromium acetylacetonate employed in Example 12 of U.S. Pat. No. 3,257,332 with the chromium tris-diorganoorthophosphate employed in this invention.

RUN A — Under a nitrogen blanket 50 ml. dry of n-heptane containing 10.0 grams (88.0 milli-gm.-moles) of triethyl aluminum were added with stirring to 1.0 gram (2.81 milli-gm.-moles) of chromium tris(acetylacetonate). A dark colored solution formed immediately accompanied by an exotherm from 20°C. to 40°C. To a clean two-liter stirred autoclave purged with ethylene was charged 1000 ml. of dry n-heptane and 25 ml. of this catalyst solution and sufficient ethylene to maintain a pressure of 40 psig. in the autoclave. The reaction was maintained at that pressure at 30°C. for 3 hours during which time about 20 grams of ethylene was consumed. The reactor was then emptied, and the product was filtered to recover at least 16 grams of solid polyethylene.

RUN B — A similar catalyst solution prepared from 100 ml. of hexane, 20 grams (176 milli-gm.-moles) of triethyl aluminum and 2 grams (5.62 milli-gm.-moles) of chromium tris (acetylacetonate) was diluted with an additional 200 ml. of hexane and was used for ethylene polymerization at about 30°C. and 40 atm. absolute pressure for 24 hours, producing about 69 grams of solid polyethylene. (See Example 12, U.S. Pat. No. 3,257,332).

RUN C — For comparison Run A was repeated using 1.0 gram (2.77 milli-gm.-mole) of chromium tris(diethylorthophosphate) instead of the 1.0 gram of chromium tris(acetylacetonate). Less than one gram of solid residue was recovered from the ethylene polymerization system.

From these runs it is evident that while the chromium tris(acetylacetonate) of the reference was a satisfactory cocatalyst with triethyl aluminum for ethylene polymerization without any additional promoter under the conditions of the reference or the conditions of this invention, the chromium tris(diethylorthophosphate) used in this invention is not the equivalent of said chromium tris(acetylacetonate).

EXAMPLE VI

When the first polymer preparation of Example I was repeated in contact with about 5 grams of commercial talc, there was produced 277 grams of polymer product having a number average molecular weight of 7,200, a weight average molecular weight of 181,000, density between 0.99 and 1.00 gm./ml. and a melting point of 133°C.

EXAMPLE VII

Glass fiber fabric woven with 20 strands of yarn per inch was impregnated with a polyethylene prepared as in Example I and formed into 0.012 inch thick sheets on a hot press. Tear strength test specimens measuring 0.5 inch by 1.0 inch were cut along lines of the square weave and split to the center along the long axis of the specimen. Force was applied in tension to the separated quarters perpendicular to the cut until tearing propagated through the specimen. This test is comparable with ASTM Single Tear Test D-1938. Failure proceeded by pulling the short axis fibers from the plastic matrix.

Eight pounds force was required to tear apart the specimen impregnated with the polyethylene resin from Example I. Four pounds force was required to produce identical failure in samples impregnated with commercial polypropylene.

We claim:

1. A composition formed by mixing (A) a chromium tris-diorgano-orthophosphate of the formula Cr[OP(O)(OR)$_2$]$_3$ in which each R is selected from the class consisting of alkyl, cycloalkyl, alkoxyalkyl, chlorinated derivatives thereof and brominated derivatives thereof, said alkyl and cycloalkyl containing one to eight carbon atoms and said alkoxyalkyl containing three to six carbon atoms, (B) an alkyl aluminum of the general formula R$_2$'R''Al in which each R' is an alkyl group of 1 to 6 carbon atoms and each R'' is selected from the group consisting of alkyl groups of 1 to 6 carbon atoms and hydrogen atoms, and (C) a halogenated olefin of from four to about eight carbon atoms, said olefin containing at least four halogen atoms at least two of which are attached to olefinic carbon atoms, there being at least one olefinic bond in conjugation with another double bond or at least one halogen atom attached to a carbon atom alpha to an olefinic double bond, the mole ratio of (A) to (B) to (C) being in the range of 0.001–1 : 1 : 1–10.

2. The composition of claim 1 wherein (C) is hexachlorobutadiene.

3. The composition of claim 1 wherein each R is an alkyl group.

4. The composition of claim 1 wherein the total number of carbon atoms in the R' and R'' substituents of component (B) is in the range of 3 to 8.

* * * * *